June 26, 1956

E. H. REMDE 2,751,994

LOAD LIMIT MECHANISM

Filed Feb. 8, 1950

INVENTOR.
EDWARD H. REMDE

BY Geo. B. Pitts

ATTORNEY

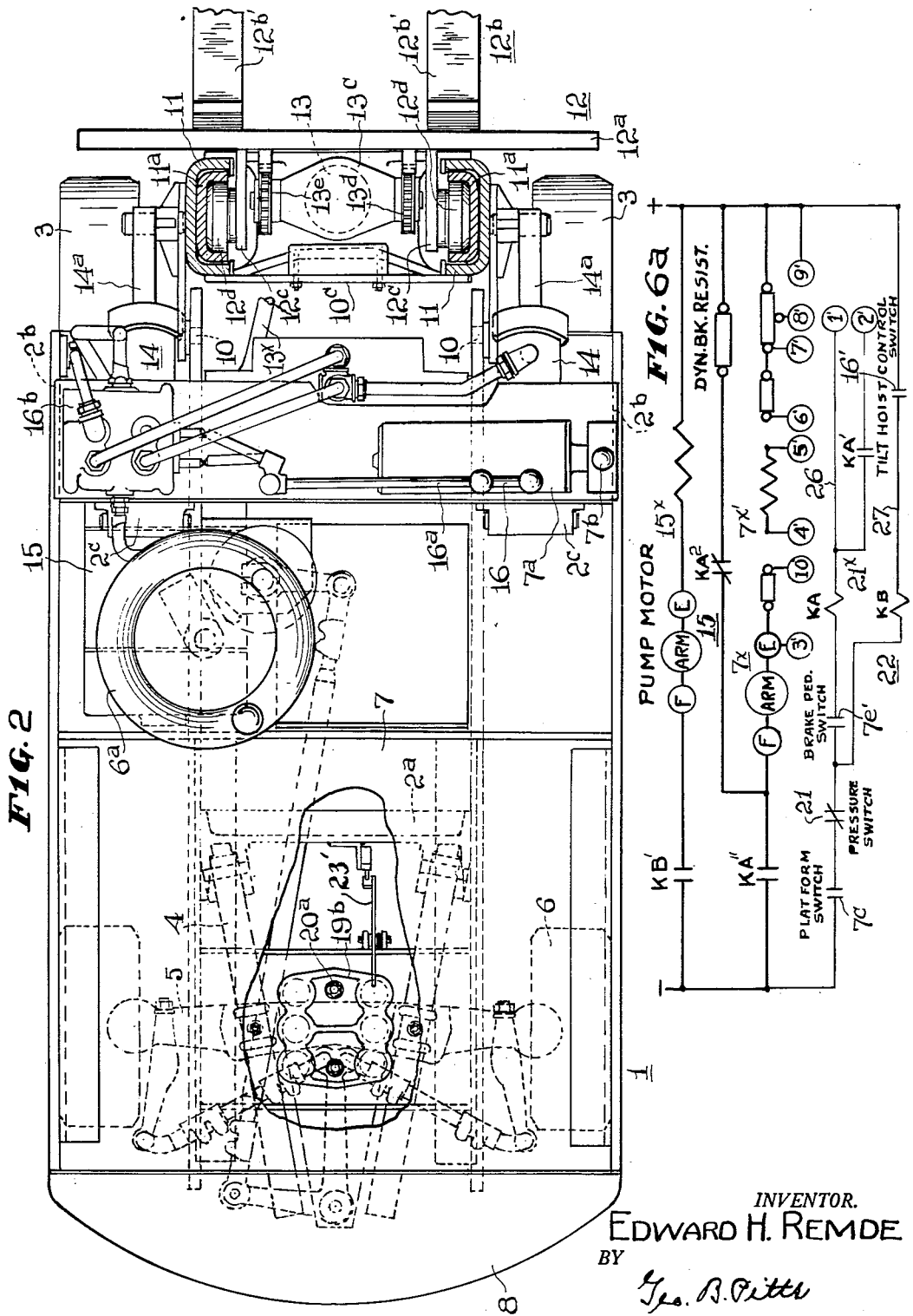

June 26, 1956  E. H. REMDE  2,751,994
LOAD LIMIT MECHANISM
Filed Feb. 8, 1950  5 Sheets-Sheet 3
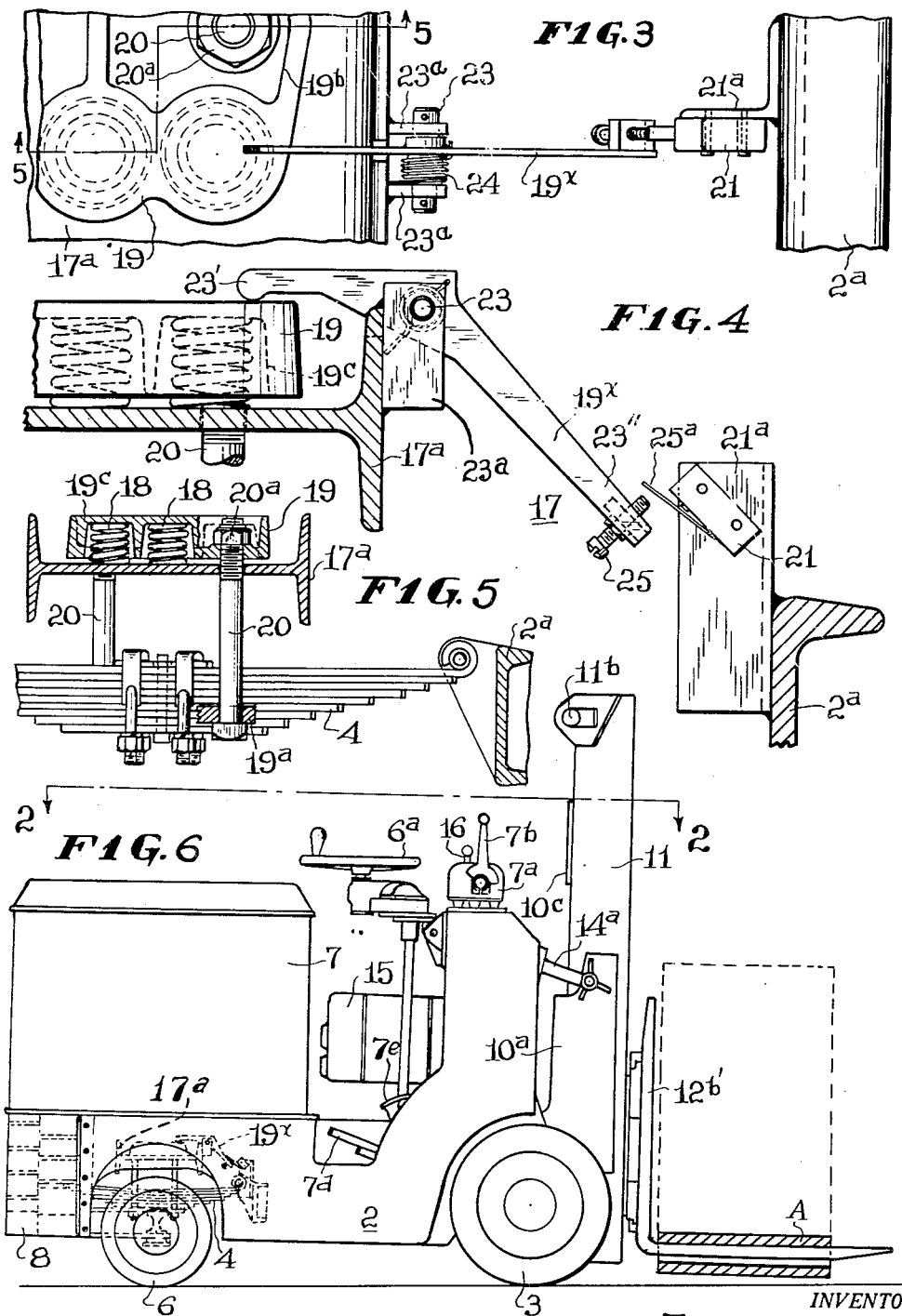
INVENTOR.
EDWARD H. REMDE
BY
Geo. B. Pitts
ATTORNEY INVENTOR.
EDWARD H. REMDE
BY
Geo. B. Pitts
ATTORNEY

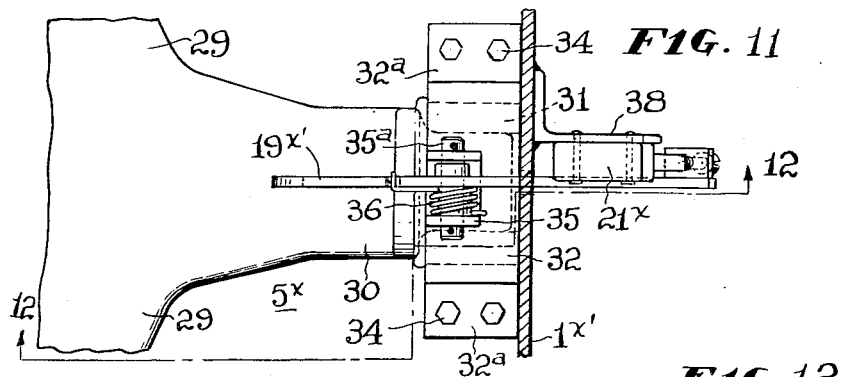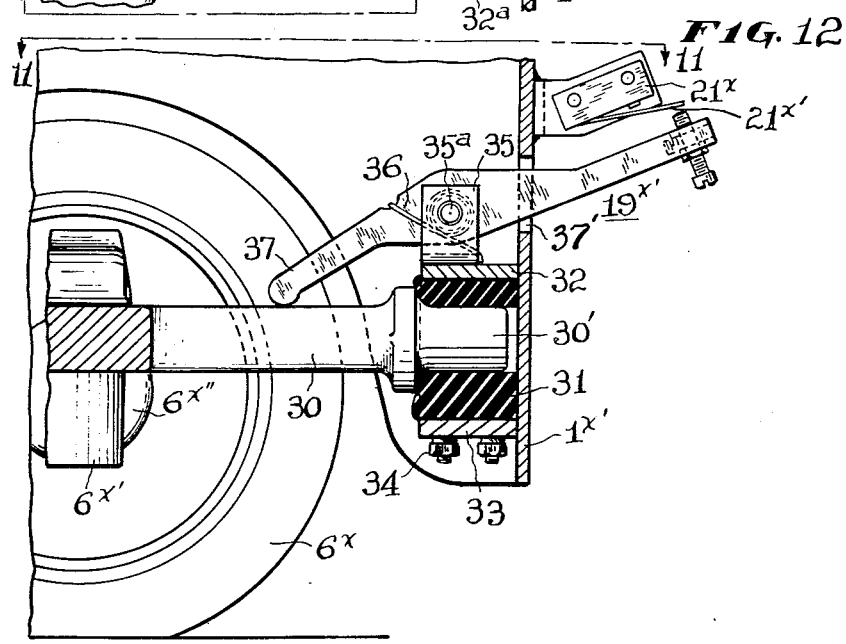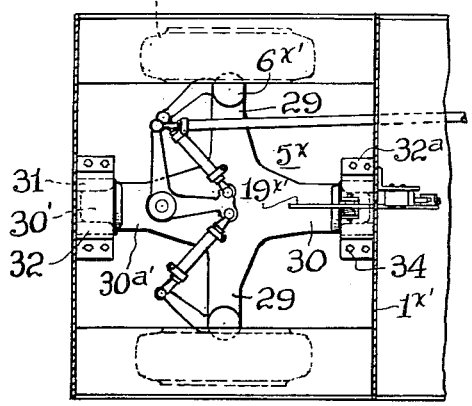

United States Patent Office 2,751,994
Patented June 26, 1956

2,751,994

LOAD LIMIT MECHANISM

Edward H. Remde, Cleveland, Ohio, assignor, by mesne assignments, to The Baker-Raulang Company, a corporation of Ohio Application February 8, 1950, Serial No. 143,064

14 Claims. (Cl. 180—82)

This invention relates to a vehicle having incorporated therein a mechanism for preventing overloading thereof, whereby undue wear on and/or danger of breakdown of the vehicle is reduced. Where the vehicle is provided with a vertically movable load carrying member, the latter may be operated to pick up and transport (a) loads consisting of bulk materials in bags, bales, rolls of paper and the like and (b) loads mounted on skids, dunnage and pallets. In the preferred application of the invention it is incorporated in a vehicle the overloading of which effects a tilting of the vehicle chassis about the wheel axle at one end thereof; in one form of vehicle construction referred to the load supporting or carrying member is suspended by means which are operable to raise and lower the member, whereas in another form of vehicle construction such member extends beyond the trunk supporting wheels at one end of the truck frame. In the preferred form of construction the load supporting member is slidably supported on the truck chassis for vertical movement, for example, an industrial elevating truck, as shown herein, wherein the load support extends beyond the truck wheels at one end of the truck frame, and is supported on an elevating member which is raised and lowered on vertical guides supported on the truck frame. In trucks of this type, the weight of the end portion of the truck chassis remote from the load supporting member and of all equipment mounted on such portion serves as a counterweight for the load which may be positioned on the load supporting member. As the load supporting member extends outwardly at one end of the truck chassis beyond the adjacent truck supporting wheels, it will be seen that the axis on which these wheels rotate forms a fulcrum between the load supporting member and the remote end portion of the chassis, so that the weight of such end portions and all equipment thereon on the adjacent side of the fulcrum determines the carrying capacity of the truck, since any load on the load supporting member exceeding the weight at the opposite end of the chassis will cause the latter to tilt about its fulcrum. While I have preferred to show a truck wherein the counterbalancing end portion of the chassis is spring or resiliently supported, this form of construction is not an essential characteristic of the invention, so long as provision is made for the counterbalancing end portion of the chassis to move relatively to the supporting member for the adjacent wheels.

While industrial trucks of this latter type are designed to carry loads having a predetermined carrying capacity as to weight, the truck driver is often induced, for sake of expediency or otherwise to overload the elevatable load support beyond the rated capacity of the truck. Such operation obviously effects undue wear on various parts of the truck, resulting in a shorter life of the truck or in causing repairs and breakage thereof, whereby the expense of keeping the truck in service is increased.

In the form of construction shown, and as later set forth, any loading of the elevating member with a load weighing in excess of its rated carrying capacity of the truck has the effect of making one or more operated parts of the truck inoperative, whereby the truck driver at once becomes aware of the overloading condition, so that it can be promptly rectified. The part or parts to be made ineffective or inoperative depend upon the electrical circuit connections and the position of the controlling switch therein, as later set forth.

One object of the invention is to provide an improved mechanism for automatically making the operating mechanism of a truck inoperative when a load, which exceeds the rated capacity of the truck, is placed on its load support, whereby strains or breakdowns and undue wear on the truck, are eliminated.

Another object of the invention is to provide an improved load limiting mechanism inter-related to the raising means for the elevating member of a truck for preventing raising of the elevating member following its engagement with an overload, but permitting the elevating member to be lowered, whereby the load may be reduced or removed.

A further object of the invention is to provide an improved load limit mechanism of simple construction and capable of quickly responding to any attempt to place a load on the load support of a truck or raise a load which exceeds a predetermined weight.

A further object of the invention is to provide, in a truck wherein a load carrier extends outwardly beyond the wheels at one end of its frame and the opposite end of the frame is movably supported on the adjacent wheels, improved means controlled by the movement of the frame relative to the last mentioned wheels, due to an overload on the load support, for making one or more operating mechanisms on the truck inoperative.

Other objects of the invention will be apparent to those skilled in the art to which my invention relates from the following description taken in connection with the accompanying drawings, wherein Fig. 1 is a side elevation of an elevating truck embodying my invention, parts being broken away;

Fig. 2 is a plan view, partly in section on the line 2—2 of Fig. 6;

Fig. 3 is a fragmentary plan view of parts shown in Figs. 1, 2 and 6, enlarged;

Fig. 4 is a side view of parts shown in Fig. 3;

Fig. 5 is a section on the line 5—5 of Fig. 3;

Fig. 6 is a side elevation of the truck showing the position of the truck chassis following the engagement of the elevating member with an overload; and Fig. 6a is a diagram of the electric circuits.

Fig. 10 is a fragmentary plan view of the rear portion of a vehicle wherein the rear wheels therefor are dirigibly supported on a member mounted to rock about a longitudinal axis;

Figure 1:
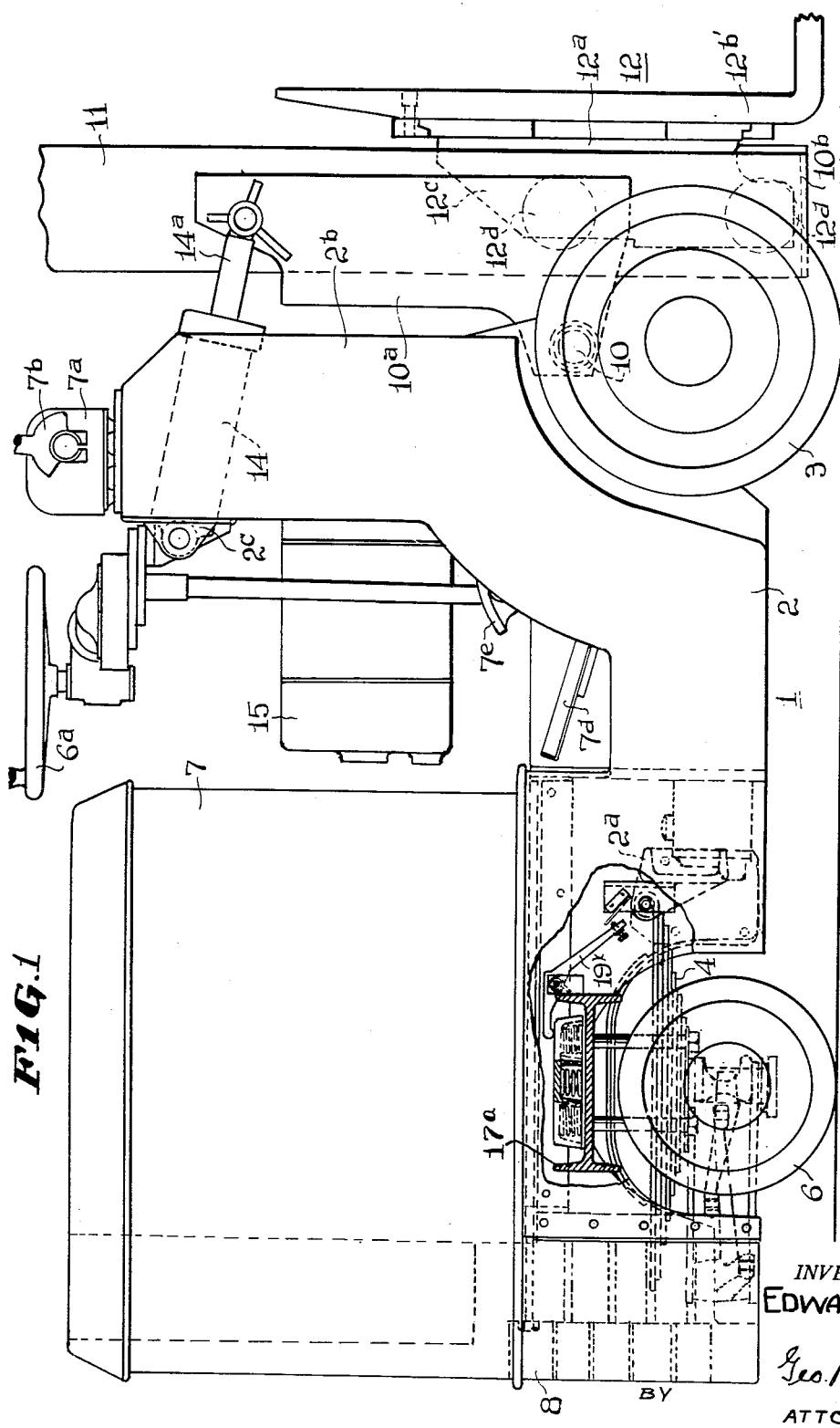

Fig. 11 is a plan view of parts shown in Figs. 10 and 12 (enlarged) on the line 11—11 of Fig. 12; and Fig. 12 is a section on the line 12—12 of Fig. 11.

In the drawings, referring to Figs. 1 to 6a, inclusive, 1 indicates as an entirety a truck comprising a frame or chassis 2 mounted at its front end on a pair of wheels 3 and at its rear end on suitable springs 4, which in turn are suitably fixed intermediate their ends to a transverse member 5 for supporting at its opposite ends rear wheels 6. In the disclosed form of construction (a) the wheels 3 are driven by a suitable driving mechanism having a power supply unit mounted on the rear end portion of the chassis 2 and enclosed in a casing 7; and (b) the wheels 6 are dirigibly mounted on the opposite ends of the member 5 for steering by a manually operable device, such as a wheel 6a. However, where found desirable, the rear wheels 6 may be driven and either the front or rear wheels may be mounted to effect steering of the truck. The travel of the truck is effected by a suitable driving mechanism which includes a motor 7x (see Fig. 6a) in a circuit 7x' and operated by a controller 7a having an operating handle 7b, the circuit being connected to batteries enclosed in the casing 7. The switch 7c for the circuit 7x' is normally open, but operated to closed position by a hinged platform 7d on which the truck driver stands. The platform 7d is biased upwardly by a spring (not shown) so that when the driver steps off the platform the latter swings upwardly and opens the circuit. 7e indicates a service brake pedal which is biased in one direction by a spring (not shown) to open switch 7e' to prevent operation of the motor 7x when current thereto is cut off. The pedal is operated to close the normally open switch 7e'. By operation of the controller 7a forward travel of the truck at different speeds is effected through fingers 1', 2', 3', etc.; whereas rearward travel at different speeds is effected through the same fingers, except that fingers 4' and 5' are interchanged. The inner ends of the springs 4 are connected in a well known manner to a bracket mounted on a cross member 2a forming part of the chassis 2; the outer ends of the springs are engaged by and have slidable relation with an inner horizontally disposed wall of a suitable bumper 8 (see Figs. 1 and 6). The front end of the chassis 2 is provided with trunnions 10 (one being shown in dotted lines—see Figs. 1 and 2) on which a pair of plates 10a are tiltably supported. The plates 10a are suitably fixed to outer guide channels 11 which slidably support inner guide channels 11a (see Fig. 2). The lower ends of the guides 11 are connected together by a base 10b and thereabove by a plate 10c, whereas the upper ends of the guides 11a are connected together by a member (not shown). 12 indicates as an entirety an elevating member consisting of a plate 12a supporting a carrier or load support 12b. The carrier 12b is shown as consisting of a pair of forks 12b' adapted to be projected into a pallet A (see Fig. 6), whereby a load on the latter may be raised. The plate 12a is provided with inwardly extending spaced supports 12c, each mounting upper and lower rollers 12d, which engage the guides 11a to slidably support the elevating member 12 thereon. The elevating member 12 is raised and the guides 11a are operated endwise upwardly relative to the guides 11 by a hydraulically operated mechanism which in the present disclosure consists of a cylinder 13 (see Fig. 9) connected at its lower end with a source of liquid supply under pressure 13x, a piston 13a reciprocatable in the cylinder and connected to a piston rod 13b the upper end of which supports a cross head 13c. The opposite ends of the cross head 13c are provided with sprockets 13d with which flexible members (such as suitable chains) 13e engage. The inner ends of the flexible members 13e are anchored to a portion of the truck chassis or guides 11 and their outer ends are connected to the elevating member 12. The cylinder 13 is mounted on the base 10b and extends upwardly between the guides (see Fig. 2). The hydraulically operated mechanism is substantially preferably similar to that shown in Letters Patent No. 2,471,429 to Paul E. Hawkins, so that further illustration and description thereof is omitted. As the parts above referred to are supported as an assembly on the plates 10a and the latter are trunnions at 10 on the chassis 2, as already described, the assembly may be tilted by operation of the pistons reciprocatable in cylinders 14 connected with the source of liquid supply under pressure 13x (see Fig. 9). The cylinders 14 extend rearwardly between spaced uprights 2b mounted on the chassis 2 and are pivotally mounted at their inner ends on the side walls of hollow brackets 2c fixed to a cross plate on the uprights 2b. The pistons operate through the rods 14a, which are pivotally connected at their outer ends to the plates 10a, to swing or tilt the latter in either direction.

The elevating member 12 is raised by supplying fluid under pressure to the lower end of the cylinder 13 to operate the piston 13a therein upwardly, the piston in turn, through the piston rod, serving to raise the crosshead 13c and the sprockets 13d, so that the chains 13e reeve about the latter and raise the elevating member 12. The pump for supplying liquid under pressure to the cylinder 13 and cylinders 14 is operated by a motor 15, connected in an electric circuit 15x and the liquid supply to the cylinder 13 and cylinders 14 is controlled by levers 16, 16a, respectively, operatively connected to valves in a casing 16b. By preference, the motor 15 is driven only when pressure in the system is required to raise the elevating member 12 or to tilt the plates 10a and parts mounted thereon. In this arrangement the levers 16, 16a, are suitably connected to a switch 16', connected in the circuit 15x, so that when either one of the levers 16, 16a, is operated it operates the switch to close the circuit 15x, whereby the motor 15 is set in operation to drive the pump and thus supply pressure to swing the elevating mechanism about the trunnions 10 or raise the elevating member 12 dependent upon which lever 16, 16a, is operated. It will be observed that the lever 16, when operated in one direction, starts the motor 15 and opens the adjacent valve to supply liquid under pressure to the cylinder 13 and through the piston and crosshead to raise the elevating member 12. To lower the elevating member, the lever 16 is operated in the other direction which operates the adjacent valve to permit flow of the liquid from the cylinder through the valve to the sump, whereby the elevating member gravitates downwardly.

17 indicates as an entirety a limiting mechanism controlled by an overload on the carrier 12b to prevent the operation of the truck as later set forth. The carrier 12b may be loaded by first projecting the carrier below a load, and then operating the hoist mechanism to raise the carrier 12b. As already set forth, the load may consist of materials in bags, bales, paper rolls and the like, or the load may be mounted on skids, dunnage or pallets, the latter form of mounting being shown for illustrative purposes in Fig. 6. Upon operation of the elevating member to raise the carrier 12b and the load thereon, if the latter exceeds a predetermined weight, as shown, the chassis 2 and parts thereon will be tilted about the axle for the front wheels so that the counterbalancing end portion of the chassis 2 will move upwardly relative to the member 5 and springs 4, as shown in Fig. 6, which relative movement will be effective, as later set forth, to operate the mechanism 17, thereby preventing raising of the load carrier and operation of travel motor 7x. In the event the load is placed or dumped onto the load carrier and its weight exceeds the rated carrying capacity of the truck, the chassis will tilt, as above set forth, and operate the limiting mechanism to make the raising mechanism as well as truck travel motor 7x inoperative.

Of the mechanism 17, 17a indicates an abutment preferably consisting of an I-beam horizontally disposed above and in alinement with the member 5 and rigidly connected at its opposite ends to the frame or chassis 2 for movement therewith when the chassis is tilted. 18 indicates as an entirety spring means interposed between the abutment 17a and a control member 19 which is operatively connected with the member 5. The control member 19 serves to control the rocking of a rocker 19x for a purpose later set forth. The connection between the member 19 and member 5 consists of the following: 19a indicates a plate suitably fixed to the member 5 intermediate its ends and formed at opposite sides of the member with openings through which connectors, such as bolts 20, extend. As shown, the bolt heads engage the lower side of the plate 19a and extend upwardly therefrom and loosely project through alined openings formed in the abutment 17a and member 19. The outer end portions of the connectors 20 are provided with nuts 20a adapted to be engaged by the member 19. Due to the fact that the spring means 18 are interposed between the abutment 17a and member 19 and tend to bias the latter upwardly, the member 19 is maintained in engagement with the nuts 20a and therefore the member is maintained in a fixed relation to the member 5.

In this arrangement it will be observed that the springs 4 permit the rear end portion of the chassis 2 to swing downwardly relative to the member 5 when the truck wheels, during truck travel, traverse rough surfaces, ruts therein and obstructions thereon, but as the spring means 18 are interposed between the abutment 17a and member 19, the latter will be biased upwardly and maintained in engagement with the nuts 20a, as above set forth. The connectors 20 are preferably disposed in a plane cutting the central longitudinal axis of the chassis 2. The member 19 consists of a casting shaped to provide (a) upwardly opening front and rear centrally disposed recesses 19b into which the upper ends of the connectors 20 extend with the nuts 20a thereon in engagement with the bottom walls of the recesses; and (b) downwardly opening recesses 19c along either side of the recesses 19b, each enclosing an expansion spring of the spring means 18 engaging the abutment 17a and bearing against the bottom wall of the recess, to bias the member 19 upwardly, so that when the chassis 2 is tilted, due to an overload on the carrier, the abutment moves upwardly relative to the member 5, whereas the member 19 being in engagement with the nuts 20a, it is held in fixed relation to the member. In this arrangement, it will be observed that the abutment 17a is free to move downwardly relative to the member 19 due to flexing of the springs 4 during travel of the truck from place to place, as already set forth, and to move upwardly relative to the member 19 when the chassis is tilted, due to an overload on the carrier 12b. The rocker 19x is fulcrumed on a shaft 23, the opposite ends of which are supported in lugs 23a fixed to the adjacent side wall of the abutment 17a. As shown in Figs. 3 and 4, a spring 24 is coiled around the hub which is provided on the rocker 19x, the opposite ends of the spring engaging the abutment 17a and the rocker to bias the latter about its fulcrum counter-clockwise as viewed in Figs. 1, 3, 4 and 6, whereby the outer end 23' of the rocker engages with and rides on the top wall of the member 19 during movement of the abutment 17a in either direction relative to the member 19 and member 5; but when the abutment 17a moves upward (due to tilting of the chassis 2) relative to the member 5, the rocker 19x rotates counter-clockwise, under influence of the spring 24, as shown in Fig. 6, whereby the inner end 23'' of the rocker engages with and operates to open position a normally closed switch 21 in the main circuit 21x to prevent operation of the motors 7x and 15.

The switch 21 is mounted on an angle 21a suitably secured to the cross member 2a (see Figs. 3 and 4). By preference, the inner end 23'' of the rocker 19x is formed with a screw threaded opening for a screw 25, the outer end of which is arranged to engage and move an element 25a movably supported on the walls of the switch 21, which element in turn operates the switch to open position. The screw 25 being adjustable in its opening, it can be positioned to engage the element 25a upon any predetermined angular movement of the rocker 19x dependent upon the limit of the overload, if any, to be allowed in the operation of the truck. When the load carrier 12b is overloaded, the switch 21 is opened and remains open until the overloading condition is relieved, whereupon the chassis 2 will swing or tilt downwardly and thus effect movement of the rocker 19x clockwise, whereby the rocker end 23'' will disengage the element 25a and permit the switch 21 to close and complete the main circuit therethrough.

Operation: if the truck is at rest and its driver not in driving position, relay coils of KA and KB in leads 26, 27, are de-energized, tilt hoist switch 16' is open, brake operating switch 7e' is open, the overload or pressure switch 21 is closed, the platform operated switch 7c is open, switches KA' and KA'', which are closed by relay KA, are open, switch KA², which is operated by relay KA, is closed, and switch KB', which is closed by relay KB, is open. If driver steps on platform 7d, switch 7c is closed. Next, the driver operates brake pedal 7e to close the circuit 21x between the controller and motor 7x. If the controller 7a is moved to finger 1' position relay coil KA is energized, switches KA' and KA'' are closed, switch KA² is opened and current is supplied to motor 7x to effect travel of the truck; if controller is moved to finger 2' position or succeeding finger positions, finger 1' is cut out so that controller cannot be reversed to a lower speed position and then moved to a high speed position without first moving it to finger 1' position.

To tilt the elevating mechanism about the trunnions 10 or to raise the load carrier, the adjacent lever 16 or 16a is operated, which operation (a) closes switch 16' to energize the coil of relay KB, whereby switch KB' is closed to close circuit 15x for pump motor 15 and (b) operates the adjacent valve to supply the liquid under pressure to the cylinders 14 or cylinder 13, dependent on which lever 16 or 16a was operated. Where the proposed operation is to raise and transport a load—for example, a load on a pallet A, the elevating member 12 is lowered and the truck driven forward to project the forks 12b' into the pallet; next the lever 16 is operated to close switch 16', whereby switch KB' will be closed by relay KB, the motor 15 will drive the pump and valve connected with lever 16 will be opened to supply liquid under pressure to cylinder 13 and raise the elevating member, whereby the forks 12b' will engage the pallet and raise it and the load thereon. However, if the load exceeds the rated carrying capacity of the truck (or such limit as may be set by the adjustment of the screw 25 to permit a predetermined movement of the rocker 19x in operating the switch 21), the load will react on the forks and effect a tilting of the chassis 2 as shown in Fig. 6, where it will be noted that the abutment has moved upwardly relative to the member 19 and rocker 19x has rocked counter-clockwise under the influence of the spring 24 and opened switch 21. It will thus be seen that upon opening of switch 21 coils of relays KA and KB are deenergized and switches KA', KA² and KB' are opened to cut off the supply of current to motors 7x and 15 and thereby prevent raising of the elevating member, tilting of the mechanism and truck travel. This inoperative condition will continue until the load is removed from the forks 12b' or its weight is reduced to or below the load limit.

Figure 7:
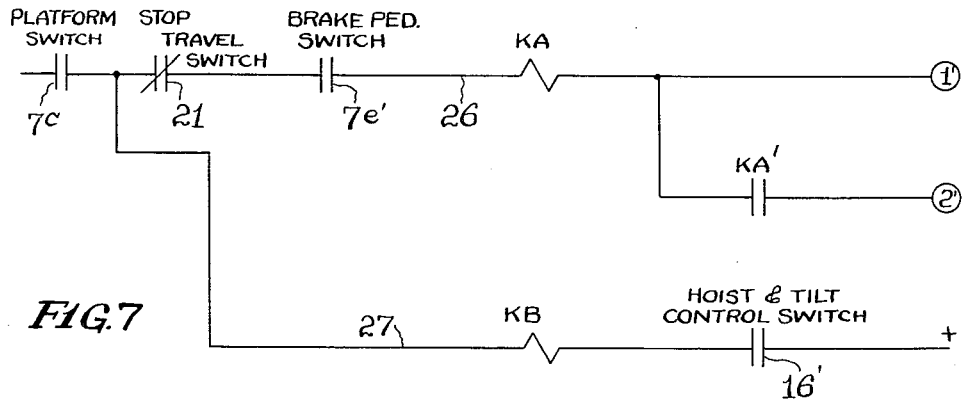
Figs. 7 and 8 illustrate modified circuits.

Fig. 7 illustrates a modified circuit wherein the lead 27, in which switch 16' is connected, is connected to lead 26 at a point outwardly of the switch 21, so that in the event of an overload on the carrier and operation of switch 21, switches KA' and KA'' are opened to cut off supply of current to motor 7x, but switch KB' remains closed to permit operation of motor 15.

Figure 8:
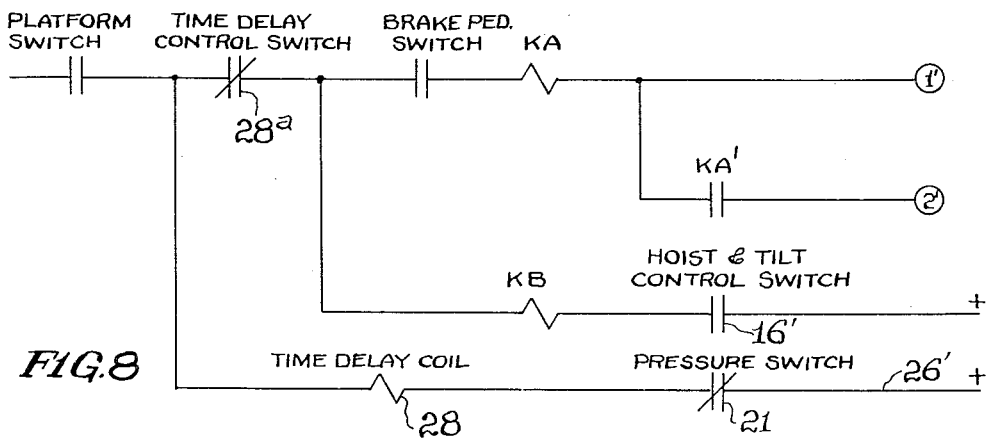

Fig. 8 shows another modified circuit, similar to the circuit shown in Fig. 6a, except that the switch 21 is connected in a lead 26' in which a time delay coil 28 is connected for controlling a normally closed switch 28a, whereby the circuit to motors 15 and 7x are maintained closed for a limited time period, to take care of a momentarily upward movement of the abutment 17a relative to the member 19 and prevent opening of switch 21 resulting from rough surface conditions during truck travel.

Figure 9:
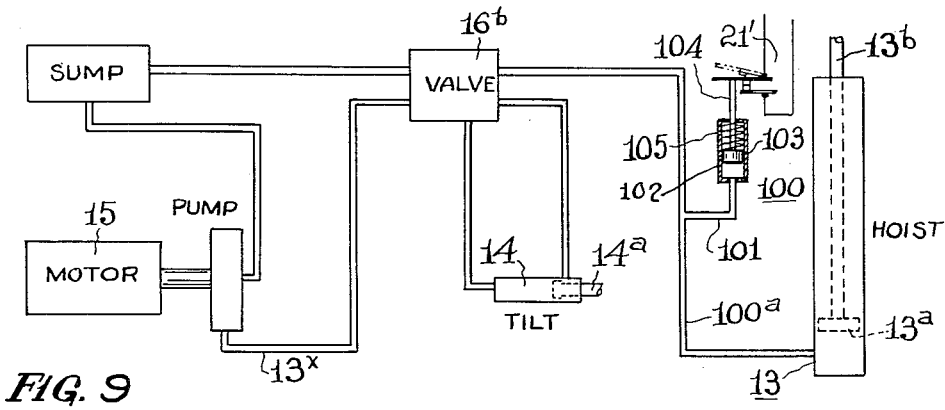
Fig. 9 illustrates diagrammatically a modified form of construction.

Fig. 9 illustrates diagrammatically a modified form of construction wherein a device 100 responsive to excess pressure in the hydraulic system operates a normally closed switch 21' which controls the circuit as hereinbefore set forth. As shown, the liquid supply connection 100a leading from the valve in the casing 16b to the lower end of the cylinder 13 is provided with a branch 101 which is connected to the pressure responsive device 100. The device 100 preferably consists of a cylinder 102 (preferably disposed vertically) and a reciprocatable piston 103 therein. The branch liquid connection 101 is connected to the lower end of the cylinder 102, whereas the piston rod 104 extends through the opposite end of the cylinder for engagement with an extension on one terminal of the switch 21' to break the circuit when the piston is moved in a direction to move the rod 104 outwardly. A coiled spring 105 is interposed between the inner side of the piston and the adjacent end wall of the cylinder, which spring tends to bias the piston 103 in a direction to move the rod 104 inwardly and away from the movable terminal of the switch 21'. The tension of the spring 105 is adjusted to resist movement of the piston 103, due to pressure on its outer side, so long as the pressure in the system does not exceed a predetermined limit, which limit is dependent on the rated load carrying capacity of the truck. Accordingly, so long as the weight of each load which is positioned on the truck load carrier, is within a rated capacity, the pressure responsive device 100 remains inoperative, but upon operation of the hoist mechanism to raise the carrier supporting a load which exceeds the limit or rated capacity, such overweight will immediately effect an increased pressure in the system and this pressure on the piston 103 will overcome the tension of the spring 105 to move the piston rod 104 outwardly, whereby the switch 21' will be operated to open position, as shown in dotted lines in Fig. 9. The pressure responsive device 100 is shown diagrammatically, but it will be understood that suitable means may be provided to regulate the tension of the spring 105. As devices of this type are well known, detail illustration thereof is omitted.

It will be understood that by providing a pressure responsive device (such as shown at 100 in Fig. 9) connected to either one of the liquid supply connections leading from the valve, which is controlled by the lever 16a, to the outer end of the adjacent cylinder 14, and associating therewith a normally closed switch similar to switch 21', any attempt to tilt the elevating mechanism inwardly about the trunnions 10, if the load carrier thereon is overloaded, the counterweighted end of the chassis 2 will move upwardly about the axle for the wheels 3, and thus operate the switch to open position to stop the motor 15.

Figs. 10, 11 and 12 illustrate the application of the control switch and the rocker for opening the switch on the truck chassis, actuated by the tilting of the latter relative to an axle member for supporting the rear wheels, which member is mounted on the chassis to rock on a longitudinal axis.

In these views 1x indicates the rear portion of the truck. The truck may be similar in construction and operation to that shown in Figs. 1 to 6a, inclusive, except that the rear portions of the chassis are changed to accommodate an axle or wheel supporting member, indicated as an entirety at 5x, for the rear wheels 6x; that is, the truck (a) is mounted on front wheels, which may be driven and the rear wheels 6x are mounted to effect steering of the truck and (b) its chassis is provided with a load support (which may be movably supported thereon) extending outwardly beyond the front wheels, so that in the event of an overload being placed on the load support the chassis will tilt about the axis of the front wheels and thus swing its rear portion upwardly relative to the rear wheels 6x. As shown in Fig. 10, the member 5x consists of laterally extending alined arms 29, 29, the end portions of which are suitably connected by knuckles 6x' to the spindles 6x'' for the wheels 6x and the spindles in turn are provided with arms, which, through suitable linkage, are operated by a steerable device on the truck in a well known manner. Intermediate the axes on which the wheels 6x swing, the supporting member 5x is provided with forwardly and rearwardly extending trunnion elements 30, 30a, the end portions 30' of which rotatably seat in hollow bearings 31 formed of suitable resilient material, such as rubber or rubber compound. The hollow bearing for each trunnion end portion 30' is molded to fit the inner walls of an inverted U-housing 32 suitably fixed to the outer side of a transversely disposed vertical plate 1x' fixed to the chassis 1x, the side walls of the U-housing terminating in flanges 32a to which the opposite end portions of a plate 33 are secured by bolts 34. The plate 33 engages the adjacent bearing 31 to secure it in position. The axis of each bearing is disposed centrally and extends longitudinally of the chassis 1x and is alined with the axis of the other bearing. In this arrangement, the axle member 5x is capable of rocking about the axis of the bearings 31 to accommodate the traverse of either wheel over rough surfaces during truck travel. The chassis 1x and axle member 5x are shown in normal position, the weight of the chassis being carried by the trunnion elements 30, 30a, so that those portions of the hollow bearings 31 above the end portions 30' are compressed.

The upper wall of the U-housing 32 supports a U-shaped hanger 35 in which the opposite ends of a transversely disposed shaft 35a are mounted. A rocker 19x' is trunnioned on the shaft 35a to swing a vertical plane, which by preference cuts the longitudinal axis of the chassis 1x. A spring 36 is coiled around the hub of the rocker 19x', one end of the spring being anchored on the inner side of the hanger 35 and its opposite end being in engagement with the outer rocker arm 37 on the other side of the hanger 35, the spring 36 being effective to maintain the outer end 37 of the rocker 19x' in engagement with the adjacent trunnion element 30'. The outer arm of the rocker 19x' extends through an opening 37' formed in the plate 1x'. In the position in which the parts are shown in Figs. 10, 11 and 12 (as already set forth), the rocker 19x' is in normal position so that the free end of its inner arm is spaced from the normally closed switch 21x. The switch 21x is supported on an angle 38 fixed to the outer side of the plate 1x', in the path of movement of the inner rocker arm. In operation, if an overload is placed on the load support of the truck, the chassis 1x will tilt about the axis of the front wheels, so that the plate 1x' will move the U-housing 32 upwardly, whereas the rocker 19x' will swing counterclockwise under the influence of the spring 36, whereby the inner rocker arm will engage and operate the movable element 21x' and open the switch to break the circuit, as already set forth and stop the operation of the truck.

From the foregoing description it will be noted that I provide a mechanism which automatically responds to a load which exceeds a predetermined weight to make inoperative the power means for raising the load carrier or means for raising or tilting the carrier and also for preventing travel of the truck. Where the control of the circut or circuits is dependent on the tilting of the truck chassis relative to the wheel supporting axle at one end of the truck, as shown in Figs. 1 to 6a, inclusive, and Figs. 10, 11 and 12 such inoperative condition will be effected in the event an overload is placed or dumped on the carrier, so that the latter cannot be raised.

It will be observed that reference has been made to the rated carrying capacity of the truck and operation of the switch 21 by a load exceeding that capacity. However, the load limiting mechanism is not to be limited to such conditions of use, since the user can set the mechanism to operate only when the weight of the load exceeds any predetermined weight limit, irrespective of the rated capacity of the truck. This setting can be attained by adjusting the screw 25, or by replacing the rocker 19x with one the arms of which have a different ratio, or by backing the nuts 20a so that a greater upward movement of the abutment would be required to open the switch 21.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

No claim is made herein to the form of construction consisting of a truck wherein the supporting wheels at one end thereof are supported on a member which is mounted to rock relative to the truck chassis on a longitudinal axis, as such structure is not the invention of applicant.

What I claim is:

1. In a vehicle, the combination of a frame mounted on a front pair of wheels, a member for supporting a rear pair of wheels, a load carrier on said frame and projecting at the front end thereof beyond the adjacent front wheels whereby a load on said carrier tends to tilt said frame about the axis of said wheels to effect upward movement of the rear end portion of said frame relative to the rear wheels, connections between said supporting member for said rear wheels and adjacent the rear end portion of said frame, an electric motor for driving certain of said wheels, a source of current supplying a circuit between said current supply and said motor including a normally closed switch, a movable device on said frame adapted to be operated by an element of said connections to open said switch and stop said motor when said frame is tilted due to an overload on said carrier, first and second bearings on said frame and spaced longitudinally thereof adjacent the rear end portion, said supporting member having forwardly and rearwardly extending trunnions mounted in said bearings with said trunnions providing the connections between said supporting member and said frame and one of said trunnions being the element of said connections that operates said device, said bearings including resilient means permitting relative movement between said frame and said trunnions.

2. In a vehicle, the combination of a frame assembly, a front pair of wheels operatively connected to said frame assembly adjacent to the front end thereof, a load carrier on said frame assembly and projecting at the front end thereof beyond the adjacent front pair of wheels whereby a load on said carrier tends to tilt said frame assembly about the axis of said front pair of wheels and effect upward movement of the rear end portion of said frame assembly, a rear wheel, a rear axle assembly connected to said rear wheel, load supporting resilient means connected between said rear axle assembly and the rear end portion of said frame assembly and compressible by a load thereon and connecting the rear end portion of said frame assembly and the rear axle assembly for relative movement therebetween upon the tilting of the frame assembly about the front pair of wheels to unload the resilient load supporting means, power means on said frame assembly to be rendered inoperative upon the overloading of said load carrier and the occurrence of said tilting, switch means operable from a normal position for rendering said power means inoperative, and a movable member carrier by one of said assemblies for movement with the rear axle assembly upon the occurence of the upward movement of the rear end portion of said frame assembly and the relative movement between said assemblies due to an overload on said carrier to operate said switch means and render said power means inoperative.

3. In a vehicle, the combination of a frame assembly, a front pair of wheels operatively connected to said frame assembly adjacent to the front end thereof, a load carrier on said frame assembly and projecting at the front end thereof beyond the adjacent front pair of wheels whereby a load on said carrier tends to tilt said frame assembly about the axis of said front pair of wheels and effect upward movement of the rear end portion of said frame assembly, a rear wheel, a rear axle assembly connected to said rear wheel and including resilient means for connecting said rear wheel to the frame assembly and for allowing relative movement between the rear axle assembly and said frame assembly due to the unloading of the rear axle assembly upon occurrence of a tilting movement about the axis of said front wheels, said resilient means including a supporting member extending longitudinally of said frame assembly and operatively connected to said wheel and at its opposite ends to said frame assembly, power means to be rendered inoperative upon the overloading of said load carrier to cause a tilting movement of said frame assembly about said front wheels, switch means operable from a normal position for rendering said power means inoperative, and a movable switch actuating member carried by one of said assemblies for movement with said rear axle assembly upon the occurrence of said relative movement to operate said switch means and render said power means inoperative.

4. In a vehicle, the combination of a frame member, a front pair of wheels, means for operatively connecting said front pair of wheels to said frame member adjacent to the front end thereof, a load carrier on said frame member and projecting therefrom at the front end thereof beyond the adjacent front pair of wheels whereby a load on said carrier tends to tilt said frame member about the axis of said front pair of wheels to effect upward movement of the rear end portion of said frame member, a supporting member for the rear end portion of said frame member connected to a rear pair of wheels, a casing connected to said frame member, said supporting member having a longitudinally extending portion supported in said casing connected to said frame member, load supporting resilient means between said supporting member and said casing and compressible by the load thereon, a motor to be rendered inoperative upon overload of said carrier, means for actuating said motor comprising an electric circuit including a switch, a movable device carried by said casing and engageable with said supporting member for operating said switch and stopping said motor when said casing is raised relative to said cylindrical member due to tilting of said frame member about the axis of said front pair of wheels caused by an overload on said load carrier.

5. In a vehicle, the combination of a frame assembly, a front pair of wheels operatively connected to said frame assembly adjacent to the front end thereof, a load carrier on said frame assembly and projecting at the front end thereof beyond the adjacent front pair of wheels whereby a load on said carrier tends to tilt said frame assembly about the axis of said front pair of wheels and effect upward movement of the rear end portion of said frame assembly, a pair of rear wheels, a rear axle assembly connected to said rear wheels and comprising a member extending longitudinally of said frame assembly approximately midway between said wheels operatively connected at its opposite ends to said frame assembly for connecting said rear wheels to said frame assembly and for allowing for relative movement between the rear axle assembly and said frame assembly upon occurrence of an upward movement, power means to be rendered inoperative upon the over-loading of the vehicle and the occurrence of a predetermined tilting movement about said front wheels, switch means operable from a normal position for rendering said power means inoperative, and a movable member carried by one of said assemblies and operatively connected to the first said member for movement therewith upon the occurrence of said relative movement to operate said switch means and render said power means inoperative.

6. In a vehicle, the combination of a frame assembly, a front pair of wheels operatively connected to said frame assembly adjacent to the front end thereof, a load carrier on said frame assembly and projecting at the front end thereof beyond the adjacent front pair of wheels whereby a load on said carrier tends to tilt said frame assembly about the axis of said front pair of wheels and effect upward movement of the rear end portion of said frame assembly, a rear wheel, a rear axle assembly connected to said rear wheel and comprising a longitudinally extending supporting member, first and second means for connecting the opposite ends of said member to said frame assembly and each comprising a casing and a resilient seat member for said supporting member for resiliently supporting said rear wheel and for allowing relative movement between the rear axle assembly and said frame assembly upon occurence of a tilting movement about the axis of said front wheels, power means to be rendered inoperative upon the overloading of the vehicle and the occurrence of a tilting movement about said front wheels, switch means operable from a normal position for rendering said power means inoperative, and a movable switch actuating member carried by one of said assemblies for movement with said rear axle assembly upon the occurrence of said relative movement to operate said switch means and render said power means inoperative.

7. In a vehicle, the combination of a frame member, a front pair of wheels, means for operatively connecting said front pair of wheels to said frame member adjacent to the front end thereof, a load carrier on said frame member and projecting therefrom at the front end thereof beyond the adjacent front pair of wheels whereby a load on said carrier tends to tilt said frame member about the axis of said front pair of wheels to effect upward movement of the rear end portion of said frame member, a rear pair of wheels, a supporting member for the rear end portion of said frame member connected to said rear pair of wheels, a casing connected to said frame member, said supporting member having a longitudinally extending portion supported in said casing operatively connected to said frame member, load supporting resilient means between said portion and said casing and compressible by the load thereon, power means on said frame member to be rendered inoperative upon the overload of said load carrier, means for rendering said power means inoperative including a switch, a movable device carried by one of said members and operatively connected to the other of said members to operate said switch and render said power means inoperative when said casing is raised relative to said portion due to tilting of said frame member about the axis of said front pair of wheels caused by an overload on said load carrier.

8. In a vehicle, the combination of a frame assembly, a front pair of wheels operatively connected to said frame assembly adjacent the front end thereof, a load carrier on said frame assembly at the front end thereof outward of said front pair of wheels whereby a load on said carrier tends to tilt said frame assembly about the axis of said front pair of wheels and effect upward motion of the rear end portion of said frame assembly, a motor on said frame assembly to be rendered inoperative upon overloading of said load carrier, a rear wheel for supporting the rear portion of said frame assembly, a rear axle assembly connected intermediate said rear wheel and said frame assembly including a longitudinal member connected to said rear wheel and extending longitudinally of said frame assembly and means operatively connecting an end portion of said longitudinal member to said frame assembly comprising a casing, a resilient seat member for said end portion, said seat member permitting relative movement between the rear axle assembly and said frame assembly when said frame assembly is tilted about said axis by an overload on said load carrier, a switch operable from a normal position for rendering said motor inoperative, and a switch actuating member carried by one of said assemblies and operatively connected to said rear axle assembly for relative movement therewith with respect to said frame assembly upon the occurrence of said tilting, said switch actuating member being operatively connected to said switch for actuating the latter upon a predetermined movement of said switch actuating member.

9. In a vehicle, the combination of a frame assembly, a front pair of wheels operatively connected to said frame assembly adjacent the front end thereof, a load carrier on said frame assembly at the front end thereof outward of said front pair of wheels whereby a load on said carrier tends to tilt said frame assembly about the axis of said front pair of wheels and effect upward motion of the rear end portion of said frame assembly, a motor on said frame assembly to be rendered inoperative upon over-loading of said load carrier, a rear wheel for supporting the rear portion of said frame assembly, a rear axle assembly connected intermediate said rear wheel and said frame assembly including a longitudinal member connected to said rear wheel and extending longitudinally of said frame assembly and means operatively connecting an end portion of said longitudinal member to said frame assembly comprising a casing having a resilient seat member for said end portion of said member, said seat member permitting relative movement between said longitudinal member and said frame assembly when said frame assembly is tilted about said axis by an overload on said load carrier, a switch on said frame assembly operable from a normal position for rendering said motor inoperative, and a switch actuating member supported on said casing and operatively connected to said longitudinal member for relative movement therewith with respect to said frame assembly the occurrence of said tilting, said switch actuating member being operatively connected to said switch for actuating the latter upon a predetermined movement of said switch actuating member.

10. In a vehicle, the combination of a frame assembly, a front pair of wheels operatively connected to said frame assembly adjacent to the front end thereof, a load carrier on said frame assembly and projecting at the front end thereof beyond the adjacent front pair of wheels whereby a load on said carrier tends to tilt said frame assembly about the axis of said front pair of wheels and effect upward movement of the rear end portion of said frame assembly, a pair of rear wheels, a rear axle assembly connected to said rear wheels, load supporting resilient bearing means for connecting said rear wheel assembly to the rear end portion of said frame assembly and compressible by a load thereon supporting the rear axle assembly for relative movement with respect to said frame assembly upon the tilting of the frame assembly about the front pair of wheels, power means on said frame assembly to be rendered inoperative upon the overloading of the vehicle and the occurrence of said tilting, switch means operable from a normal position for rendering said power means inoperative, and a movable member carried by one of said assemblies and operatively connected to the rear axle assembly for relative movement therewith upon the occurrence of relative movement between said assemblies due to the tilting of the frame assembly about the front axis to operate said switch means and render said power means inoperative.

11. In a vehicle, the combination of a frame assembly, a front pair of wheels operatively connected to said frame assembly adjacent the front end thereof, a load carrier on said frame assembly at the front end thereof outward of said front pair of wheels whereby a load on said carrier tends to tilt said frame assembly about the axis of said front pair of wheels and effect upward motion of the rear end portion of said frame assembly, power means on said frame assembly to be rendered inoperative upon overloading of said load carrier, a pair of rear wheels for supporting the rear portion of said frame assembly, a rear axle assembly connected intermediate said rear wheels and said frame assembly including a longitudinal member connected to said rear wheels and extending longitudinally of said frame and bearing means operatively and journally connecting an end portion of said longitudinal member to said frame comprising a casing having a resilient seat member for said end portion, said seat member permitting relative movement between said longitudinal membe rand said frame assembly when said frame assembly is tilted about said axis by an overload on said load carrier and limited rotational movement of said longitudinal member, a switch operable from a normal position for rendering said power means inoperative, and a switch actuating member carried by one of said assemblies for movement with said supporting member upon the occurrence of said tilting, said switch actuating member being operatively connected to said switch for actuating the latter upon a predetermined movement of said switch actuating member.

12. In a vehicle, the combination of a frame assembly, a front pair of wheels operatively connected to said frame assembly adjacent to the front end thereof, a load carrier on said frame assembly and projecting at the front end thereof beyond the adjacent front pair of wheels whereby a load on said carrier tends to tilt said frame assembly about the axis of said front pair of wheels and effect upward movement of the rear end portion of said frame assembly, a pair of rear wheels, a member interconnecting said rear wheels, load supporting resilient means compressible by a load thereon connecting the rear end portion of said frame and said member for relative movement therebetween upon the unloading of said resilient means due to the upward movement of the rear end portion of the frame assembly, power means on said frame assembly to be rendered inoperative upon the overloading of said load carrier, switch means operable from a normal position for rendering said power means inoperative, and a movable element carried by said frame assembly for operating said switch means operatively connecting said movable element to said member for relative movement therewith comprising an abutment member engaged by said element and movable in one direction to operate said switch to render said power means inoperative, spring means yieldably urging said abutment member in said one direction connected between the abutment member and the frame assembly, and means limiting the movement of said abutment member in said one direction connected to said member interconnecting said rear wheels for relative movement therewith with respect to said frame assembly upon the occurrence of said upward movement.

13. In a vehicle, the combination of a frame assembly, a front pair of wheels operatively connected to said frame assembly adjacent to the front end thereof, a load carrier on said frame assembly and projecting at the front end thereof beyond the adjacent front pair of wheels whereby a load on said carrier tends to tilt said frame assembly about the axis of said front pair of wheels and effect upward movement of the rear end portion of said frame assembly, a rear pair of wheels, a member interconnecting said rear wheels, a leaf spring connected to said member approximately midway between the ends of the member and having the opposite ends of the spring connected to said frame assembly and compressible by a load thereon and permitting relative movement between the member and the frame assembly upon the upward movement of the rear end portion of the frame assembly about the front pair of wheels, power means on said frame assembly to be rendered inoperative upon the overloading of the vehicle and the occurrence of said tilting, switch means operable from a normal position for rendering said power means inoperative, a movable element carried by said frame assembly, and means operatively connecting the movable element to said member interconnecting the rear wheels for relative movement therewith with respect to said frame assembly upon the occurrence of said upward movement to operate said switch means and render said power means inoperative comprising an abutment member engaged by said element and movable in one direction to operate said switch to render said power means inoperative, spring means yieldably urging said abutment member in said one direction connected between the abutment member and the frame assembly, and means limiting the movement of said abutment member in said one direction connected to said member interconnecting said rear wheels for relative movement therewith with respect to said frame assembly upon the occurrence of said upward movement.

14. In a vehicle, the combination of a frame mounted on a front pair of wheels, means for supporting a rear pair of wheels, a load carrier on said frame and projecting at the front end thereof beyond the adjacent wheels, whereby a load on said carrier tends to tilt said frame about the axis of said wheels to effect upward movement of the other end portion of said frame relative to said rear wheels, connections between said rear wheel supporting means and the adjacent end portion of said frame, a motor for driving certain of said wheels, a source of electric current supply, a circuit between said current supply and said motor, including a normally closed switch, a movable device carried by said frame arranged to be operated by an element of said connections to open said switch and stop said motor when said frame is tilted due to an overload on said load carrier, said rear wheel supporting means being provided with a longitudinally extending journal including a cylindrical member supported in a bearing interposed between said rear wheel supporting means and said end portion of the frame, the said journal providing said connections between said rear wheel supporting means and said frame, and the journal being the element of said connections that operates said device, said journal comprising a casing and material therein in which a wheel supporting element of said bearing is seated, said material being yieldable to accommodate the tilting movement of said frame to operate said device.

References Cited in the file of this patent

UNITED STATES PATENTS

| | | |
|---|---|---|
| 1,122,797 | Osterhoudt | Dec. 29, 1914 |
| 1,206,953 | Wales | Dec. 5, 1916 |
| 1,436,191 | Nichols | Nov. 21, 1922 |
| 2,242,453 | Cochran | May 20, 1941 |
| 2,256,314 | Dunham | Sept. 16, 1941 |
| 2,475,963 | Howell | July 12, 1949 |